Figure 1:
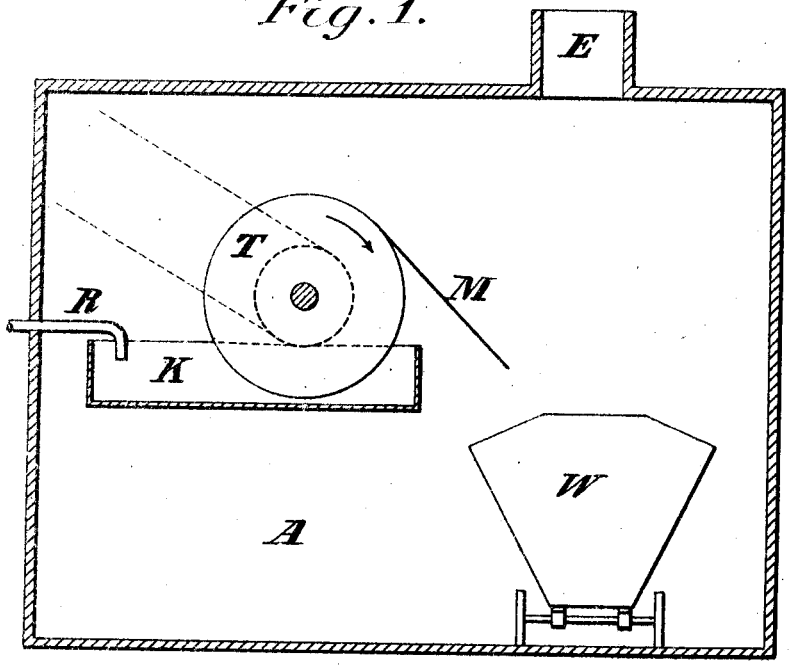

A. BRÄUER.
PROCESS FOR DISTILLING FORMIC ACID.
APPLICATION FILED OCT. 1, 1915.

1,174,663.

Patented Mar. 7, 1916.

Inventor
Adolf Bräuer
by Ottmmm
his Attorney

UNITED STATES PATENT OFFICE.

ADOLF BRÄUER, OF GRÜNAU, NEAR BERLIN, GERMANY, ASSIGNOR TO CHEMISCHE FABRIK GRÜNAU LANDSHOFF & MEYER AKTIENGESELLSCHAFT, OF GRÜNAU, GERMANY.

PROCESS FOR DISTILLING FORMIC ACID.

1,174,663.   Specification of Letters Patent.   Patented Mar. 7, 1916.

Application filed October 1, 1915. Serial No. 53,634.

*To all whom it may concern:*

Be it known that I, ADOLF BRÄUER, a subject of the Emperor of Austria-Hungary, residing at Grünau, near Berlin, in the Empire of Germany, have invented certain new and useful Improvements in Processes for Distilling Formic Acid, of which the following is a specification.

Formic acid is produced on a large scale by decomposing sodium formate with sulfuric acid and separating the substances formed by the reaction i. e., formic acid and sodium sulfate by distillation.

In effecting distillation by the process at present generally in use, the still which is provided with a strong agitator, is charged with a quantity of the mixture of reaction according to its capacity and the formic acid is driven off in a vacuum or by means of a circulating air current. It has been found in practice that in the first stage of the distilling process the boiling of the mass is very brisk, whereas it gradually decreases, as the percentage of free acid in the mixture diminishes, until it becomes slower by degrees and can only be finished in a vacuum or by means of a circulating current of air. It was not possible to overcome this undesirable delay in the distilling process by any means, because it is due to the increase in the bulk of the sulfate in the mass to be distilled which thus is converted into a thick paste. In spite of vigorous agitation the thick paste covers the heating surfaces of the still, so that heat is impeded in its passage to the mass under treatment. The sulfate must be dragged about in the still as a dead weight and causes a great consumption of power and heat, until the distillation is finished. It has been found by experience that the driving off of the last third of the total formic acid in the charge to be distilled requires about two thirds of the time necessary for the whole distillation.

I have found that the distillation can be effected much more quickly and with a great saving of cost for labor, while the drawbacks mentioned above can also be avoided, if the mixture of formate and sulfuric acid is placed on a surface-evaporator in a thin layer. The mixture may be placed on a heated body of round shape, for instance a rotating heated roller or drum, while after the acid has been driven off the sulfate is at once scraped off. This can be done continuously, so that the process may be carried out without interruption. By scraping off the sulfate fresh heating surfaces are constantly offered to the mixture to be distilled and the most inconvenient and troublesome action of the sulfate present is efficiently avoided.

I am aware that a similar process has been applied to the evaporation of milk, to the drying of potatoes and other similar products. In all these drying processes, the volatile portion is, as a rule, the product which has no value, while the solid residue is the material to be recovered. In these drying processes, the volatile portion, i. e. the distillate, is practically without exception a liquor of neutral reaction, while in the present process the distillate after condensation forms a strong acid liquor. It was certainly surprising, that a substance that has the property of attacking iron so very strongly as formic acid could be distilled in that way, where the use of iron rollers is almost imperative. Apparently this is due to the evaporation proceeding so completely and quickly, that in spite of the high boiling point of formic acid, which is even raised by the presence of great quantities of sulfate, steam pressure of 4 to 6 pounds per square inch is sufficient to drive off all the formic acid in a short time.

Experiments have shown that I can perform the entire distillation of the formic acid without the application of a vacuum or a circulating current of air which appeared impossible up to the present. It is only necessary to draw off by means of a fan the specifically heavy vapors of formic acid and to drive them to the condensing apparatus. By these means the yield of the finished acid is somewhat increased, because the losses produced by the distillation *in vacuo* are entirely eliminated.

A further advantage of my novel process consists in the possibility of increasing the output of strong formic acid which results from the heating surface being completely utilized. Calculated on the unit of surface, I have found that I can distill from 2 to 3 times as much formic acid in the same time as with the old system of distillation in a still. The greatest advantage, however, lies in a considerable reduction of the working expenses. The consumption of steam and power is reduced to a small portion. The costs of labor, repairs and general expenses are distributed over a greatly increased output and the space taken up by the heated rollers and appurtenances with the equal capacity of production is only a fraction of the old apparatus. The costs of the plant are also greatly diminished.

Finally it should be noted that distillation according to the present process can be interrupted at any moment and can be controlled at will, which is not possible with the old apparatus.

A further improvement consists in the continuous separation of the sulfate in a closed chamber, whereby the liberation of the strongly acid vapors, so very damaging to the health of the workmen, is totally prevented.

A diagrammatic representation of an apparatus suitable for carrying out my novel process is shown in the accompanying drawing, in which—

Figure 2:
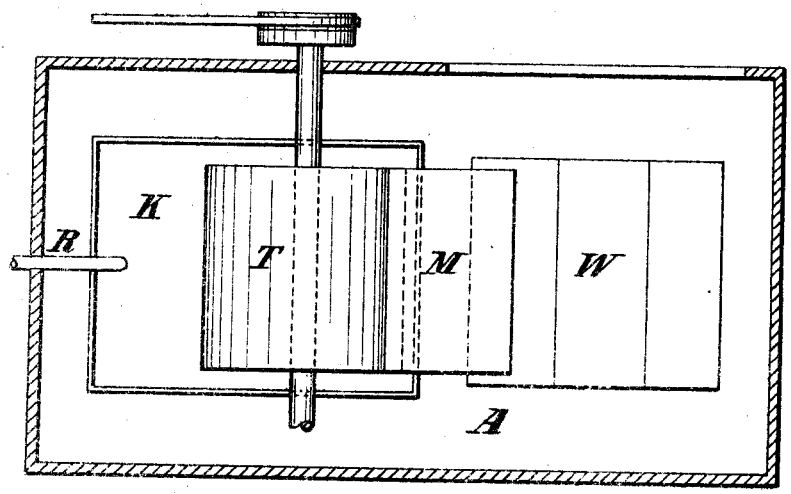

Figure 1 is a vertical section and Fig. 2 a plan.

Into a closed chamber A is placed a box K into which a heatable drum T is dipped in such a manner that as the drum rotates it is covered with a thin layer of the mixture of formate and sulfuric acid which is continuously fed into the box K by means of a pipe R. By the heat aqueous vapors of formic acid are at once liberated which escape through the pipe E and are carried to a condenser (not shown), while the solid residue on the drum is scraped off by a knife M and falls into a car W.

It will be understood that the specific apparatus illustrated and described is merely illustrative, and that my process is not limited to the use of any particular kind of apparatus. The construction of the latter may be varied to suit the requirements of any given occasion.

What I claim is:—

1. A process for distilling formic acid, consisting in covering a heated rotating surface-evaporator with a mixture of a formate and sulfuric acid in a thin layer, whereupon the solid residue is scraped off after the liberation of the formic acid vapors and the evaporation of the mass has taken place, before a new supply of the mixture is brought onto the surface of the rotating evaporator, substantially as described.

2. A process for distilling formic acid, consisting in covering a heated drum with a mixture of a formate and sulfuric acid in a thin layer, whereupon the solid residue is scraped off after the liberation of the formic acid vapors and the evaporation of the mass has taken place, before a new supply of the mixture is brought onto the surface of the rotating evaporator, substantially as described.

3. The herein described process of distilling formic acid, which consists in applying a thin layer of a mixture of a formate and sulfuric acid to an evaporating surface, driving off the formic acid vapors by heat, and removing the solid residue from the evaporating surface.

In testimony whereof I affix my signature in presence of two witnesses.

ADOLF BRÄUER.

Witnesses:
 WOLDEMAR HAUPT,
 HENRY HASPER.